3,370,339
MACHINE FOR RELEASING WINDING GUIDES FROM WOUND ELECTRIC MOTOR PARTS
Jean Soulet, Asnieres, and Michel Fert, Paris, France, assignors to General Motors Corp., Detroit, Mich., a corporation of Delaware
Filed Oct. 4, 1965, Ser. No. 492,409
Claims priority, application Great Britain, Dec. 31, 1964, 52,972
5 Claims. (Cl. 29—205)

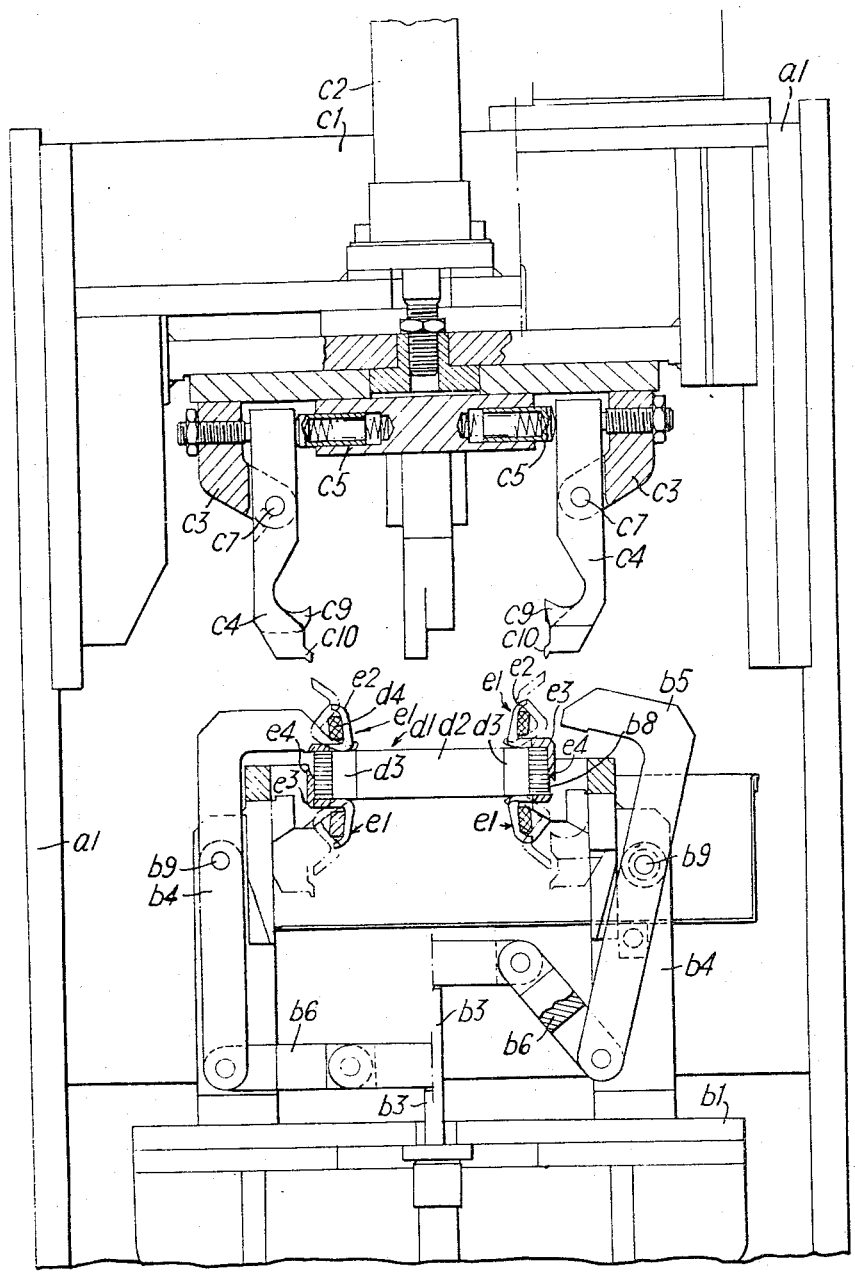

ABSTRACT OF THE DISCLOSURE

A stator winding guide releasing machine having a reciprocatory head member which supports a plurality of finger members, one for each pair of winding guides to be removed, each having two oppositely directed tooth portions arranged to engage a corresponding winding guide. Upon each stroke of the head member in a first direction, the tooth portion of each finger member directed in the direction of the motion of the head member engages a corresponding winding guide and upon each stroke of the head member in the opposite direction, the tooth portion of each finger member directed in the opposite direction engages a corresponding winding guide to impart a rotary motion to the respective engaged winding guides to disengage the respective guides from the overlying circumferential windings.

---

This invention relates to a machine for releasing winding guides from wound electric motor parts.

In the machine-winding of electric motor parts, for example stators, it is sometimes necessary to use winding guides which are initially held by some temporary attachment on the part to be wound and which, when the winding operation is complete, and the temporary attachment taken away, are left tightly held by the runs of winding which they have guided.

The individual removal by hand of these guides is laborious and time-consuming. By the present invention a machine may be constructed for the simultaneous release of a number of the winding guides.

According to the present invention, a machine for releasing winding guides from wound electric motor parts comprises a reciprocatable head carrying fingers arranged so that, by reciprocation of the head, they are caused to bear against the guides and loosen them from the overlying windings.

The fingers on the reciprocatable head may be in circular disposition corresponding to a circular arrangement of winding guides; and each finger may have at the tip a tooth so shaped and directed as to engage between a guide and the wound part and effect the loosening of the guide by a rotatory movement of it.

The machine may include a clamp support having releasable jaws to clamp a wound motor part, the support being movable into and out of alignment with the reciprocatable head.

Machines according to the invention are applicable for acting on wound stators, but may also be applicable to the treatment of wound rotors.

In the case of the treatment of a wound stator having winding guides on each of the two opposite sides, each of the fingers may have two teeth arranged so that the one tooth releases a guide on one side of the stator during the initial stroke of the head, and the other tooth releases a guide on the other side of the stator during the return stroke of the head.

An example of a machine according to the invention for the treatment of wound stators, is described below in greater detail with reference to the accompanying drawing, which is a side elevation of the machine, partly in section.

This machine has a clamp support $b1$, which for ease of loading may be pivotable as a whole, on a horizontal pivot (not shown) by a hydraulic piston (also not shown), into and out of the operating position. The clamp support $b1$ has a circular socket $b8$ into which one of the wound stators $d1$ with its winding guides $e1$ still in position can fit, and also has jaw-holders $b4$ with pivotally-movable jaws $b5$, angularly spaced around a circle, to clamp a stator in the socket (for example, four jaws $b5$ at a 90° spacing). The jaws $b5$ are simultaneously movable from unclamped to clamped position about their pivots $b9$ by an hydraulic piston $b3$ situated within the circle of jaws and pivotally-connected to each jaw by a toggle link $b6$ pivoted to the jaw in question.

The wound stator $d1$ for which this machine is suitable comprises a pack of circular metal laminae with a central opening $d2$ and axially directed slots $d3$ through the inner periphery of the laminae. The windings include circumferential courses $d4$ of which the end portion of the wire is turned in an axial direction to pass through the slots $d3$. Each side of one form of stator requires, for example, eight winding guides $e1$ for each side; thus when the stator is clamped in the socket eight of these guides are above and eight below. Each guide $e1$ has one or more fork-like prongs $e2$ pointing in a generally axial direction from the pack of laminae. Each guide also includes a right-angled attachment portion $e3$ resting on the right-angled edge of the stator pack, with heel portions $e4$ directed along the outer peripheral curved surface of the pack. The heels $e4$ of the guides on the upper surface are angularly displaced with reference to those on the lower surface.

The machine also includes a reciprocatory head $c1$ movable by a hydraulic piston $c2$ up and down on fixed slides $a1$ in a vertical path above the clamp support $b1$. The head $c1$ includes a support or supports $c3$ carrying extractor fingers $c4$ angularly spaced around a circle, the spacing and number being suitably determined in relation to that of the winding guides to be removed. The fingers $c4$ point downwards and each is pivoted at $c7$ intermediate its length to the support $c3$. Each finger has at the lower tip two oppositely-pointing teeth $c9$, $c10$, one tooth pointing upwards and the other downwards, such teeth being also angularly displaced sideways one from the other.

Before operation of the head $c1$, the stator is clamped by the jaws $b5$ by movement of the piston $b3$, through the toggles $b6$. The left and right-hand sides of the figure show the jaws in clamped and unclamped positions, respectively.

The operation of the head $c1$ on a single stator involves a downward and upward stroke. In the course of the downward stroke the lower tooth $c10$ of each finger $c4$ acts on the heel of one of the winding guides of the lower series and removes it. On the upward return stroke of the head the upper tooth $c9$ on each finger contacts and removes one of the upper series of winding guides.

In the removal of each winding guide $e1$ the appropriate tooth inserts itself with a wedge-like action between the heel $e4$ of the guide and the peripheral edge of the stator pack, and imparts a lever-like rotatory motion of the guide $e1$ which disengages it from the circumferential runs $d4$ of winding overlying it.

During the extraction of each winding guide the finger $c4$ concerned undergoes a small pivotal movement about $c7$ against the pressure of spring buffers $c5$ arranged inside the circle of the upper tips of the fingers, each buffer being engageable by one of the fingers.

While the embodiments of the present invention as herein disclosed constitute preferred forms, it is to be understood that other forms might be adopted.

What is claimed is as follows:

1. A machine for releasing circularly-disposed winding guides from wound electric motor parts, comprising a reciprocatable head, and fingers in circular disposition carried by said head and arranged so that, by reciprocation of the head, the fingers bear against the guides and loosen them from the windings, each of said fingers having a tooth adapted to engage between one of the guides and the said wound part and effect the loosening by a rotatory movement of said guide.

2. A machine according to claim 1 having a support which has releasable jaws to clamp a wound motor part and which is in alignment with said reciprocatable head.

3. A machine according to claim 1, in which each of said fingers has two mutually displaced teeth, arranged so that the one tooth is adapted to release a winding guide on one side of the wound part during initial stroke of said reciprocatable head, and the other tooth is adapted to release a winding guide on the other side of the wound part during the return stroke of said head.

4. A machine for releasing circularly-displaced winding guides from each side of a wound electric motor stator, said machine comprising slide rails, a head reciprocatable on said rails, circularly-arranged fingers on the head adapted by reciprocation of the head to bear against the guides and loosen them from the windings, and a support which carries circularly arranged jaws to clamp a wound stator; each of said fingers having two teeth which are mutually-displaced so that one of said teeth is adapted to release a guide on one side of the stator during the initial stroke of the head, and the other of said teeth is adapted to release a guide on the other of the stator side during the return stroke of the head.

5. A machine according to claim 4, in which the fingers are mounted for limited pivotal movement against spring pressure during the releasing of the winding guides.

References Cited

UNITED STATES PATENTS

| 1,650,558 | 11/1927 | White | 29—205 |
| 3,187,419 | 6/1965 | Johnson et al. | 29—205 |

THOMAS H. EAGER, *Primary Examiner.*